Dec. 13, 1927.

G. V. JOHNSTON 1,652,481

ELECTRIC TUBE WELDING MACHINE

Filed Nov. 19, 1923     3 Sheets-Sheet 2

Inventor:
Gustave V. Johnston
By Rector Hibben Davis Macauley
Attys

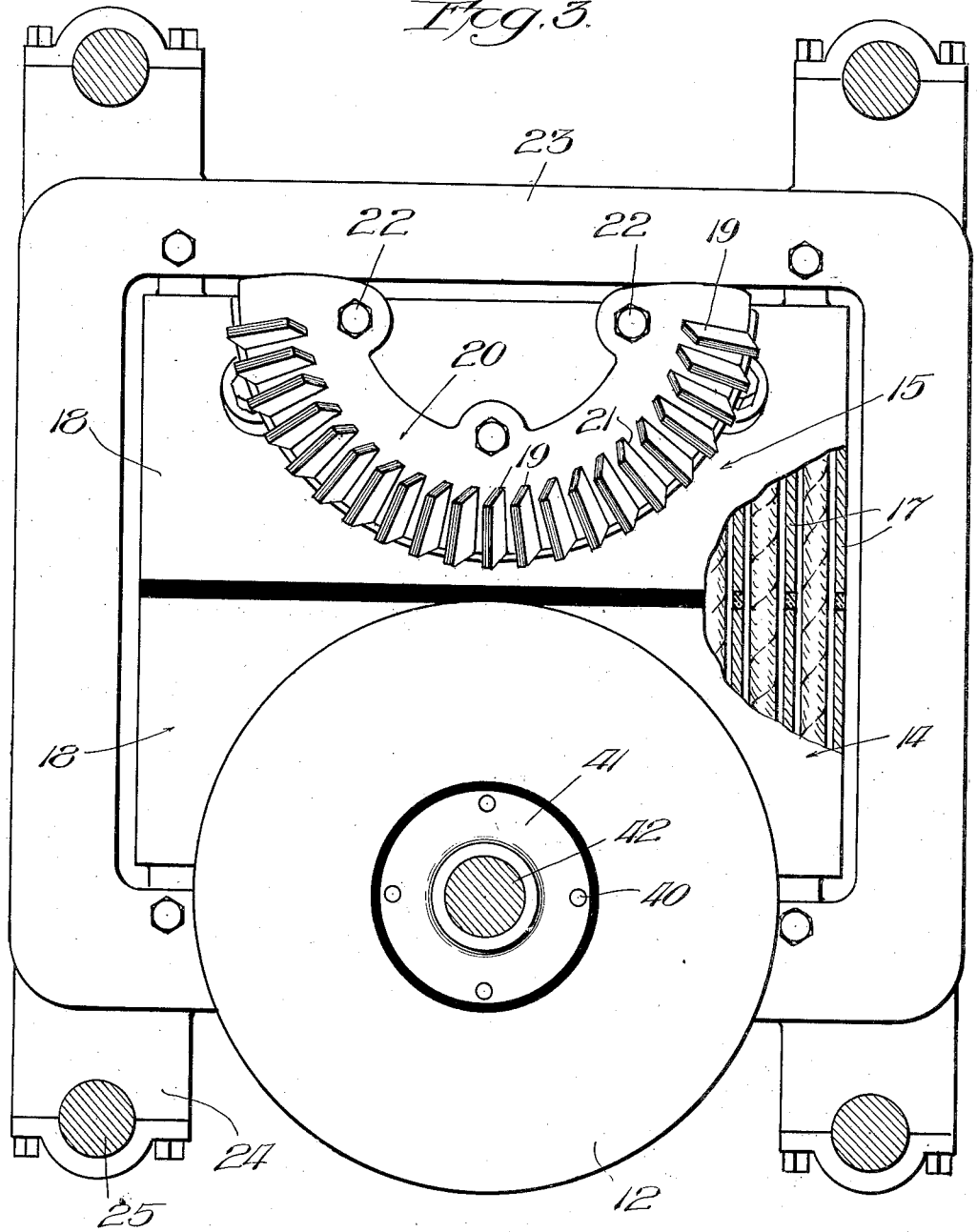

Patented Dec. 13, 1927.

1,652,481

UNITED STATES PATENT OFFICE.

GUSTAVE V. JOHNSTON, OF CHICAGO, ILLINOIS, ASSIGNOR TO STEEL AND TUBES, INCORPORATED, OF CLEVELAND, OHIO, A CORPORATION OF OHIO.

ELECTRIC TUBE-WELDING MACHINE.

Application filed November 19, 1923. Serial No. 675,453.

My invention relates to improvements in electric welding machines, and in some of its features more particularly to machines for butt-welding tubing.

Among the objects of my invention are to provide a welding machine suitable for high speed operation under most efficient operating conditions; to provide an organization of roller-electrodes and cooperating supporting-roller means to constitute a welding throat for handling the moving tube-stock most effectively under requisite pressure and with greatest accuracy in butt-to-butt presentation of the edges of the seam-cleft; to co-relate the roller electrode to the transformer which supplies welding current thereto, for most effective cooperation; and to provide electrode-contacting brush-means for establishing most simple, reliable and efficient low-resistance connection between the transformer's secondary terminal and said electrode. Other and further objects of my invention are to provide a tube-welder that, throughout, is simple, rugged, inexpensive in manufacture, easily maintained and facilely operated.

To these ends my invention consists in the combinations of parts and features of construction hereinafter described and claimed.

Figure 1:
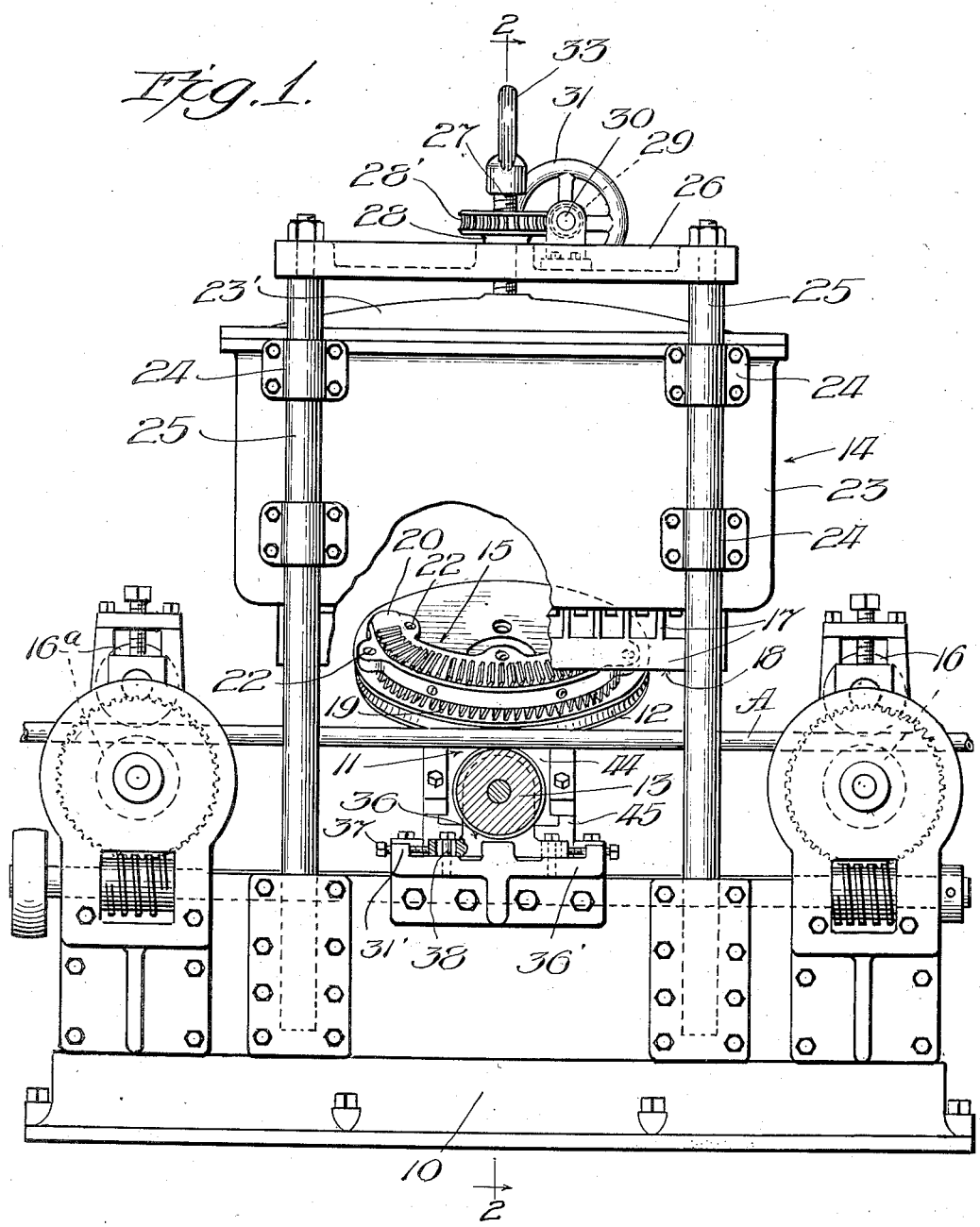
Figure 2:
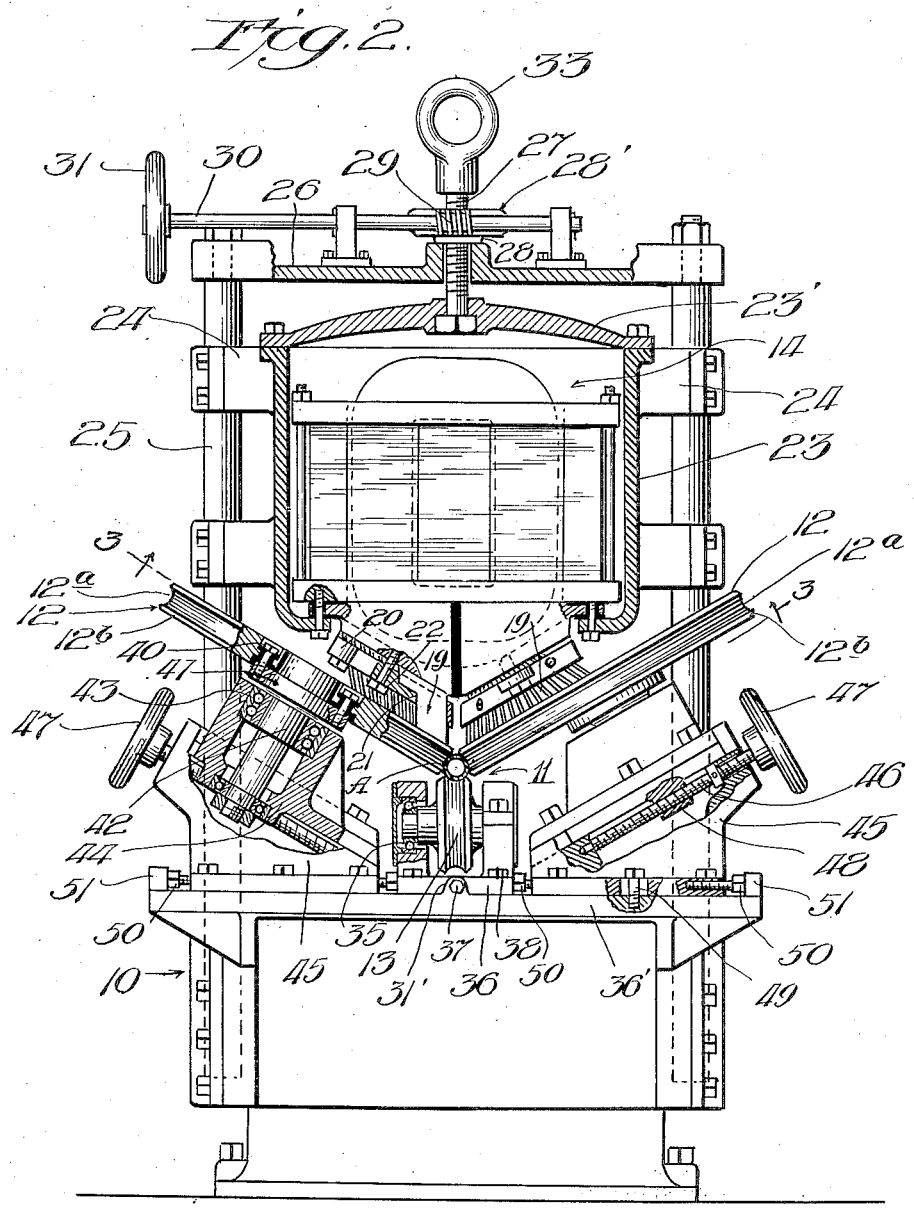

In the drawings wherein I have shown a single embodiment of my invention, for purposes of full disclosure of one desirable form thereof, Figure 1 is a transverse vertical section, with parts in elevation, through the welding machine at its welding throat; Fig. 2 is a side elevation, with the right hand electrode removed and with parts in section; and Fig. 3 is an inverted plan view of the brush arrangement, with parts broken away.

In the drawings, 10 indicates the main frame of the machine. On it are mounted the parts which provide the welding throat 11, shown as comprising two opposed peripherally grooved roller electrodes 12, 12 and cooperating grooved pressure-roller means 13, and on it is also mounted the electrical transformer 14 for supplying current of low voltage and large amperage to the electrodes through the intervening brush-connections 15.

The butt-seamed tube-stock A, initially of slightly greater circumferential size than the tube-pass of the welding throat, will be fed through the latter with the roller-electrodes straddling the seam-cleft, and the seam will be resistance-welded by the flow of alternating current impulses across the seam-cleft, between the electrodes, while the stock is under pressure in its passage through the throat. The longitudinal movement of the tube-stock may be caused in any suitable way. Usually it is desirable to weld the tubing continuously in long runs, as the open-seamed stock leaves the forming machine, and therefore, diagrammatically, I have illustrated at 16 and 16ª certain power-driven means, respectively typified as the terminal rollers of the tube-forming machine, and certain tube strengthening rollers, either or both of which may be used for impelling the stock through the welding throat. Thus in the particular embodiment shown the throat-rollers will be frictionally rotated by contact with the tubing, rather than themselves being power-driven, as they may be if desired.

In the general organization of the machine I arrange the roller electrodes 12, 12 on upwardly extending axes, preferably convergently inclined somewhat to the vertical, and dispose the transformer 14 in vertical register with these electrodes so that the "secondary" 17 of the transformer (which preferably is a single-turn, slotted "comb" or coil in the form of an integral copper casting) may be provided with terminal-portions 18, 18, in vertical line with and preferably substantially parallel with, the confronting faces of the roller electrodes between the axes of rotation of said electrodes. To establish electrical connection between each electrode and the respective under-side of the secondary terminal that is illustrated as directly above the electrode, I provide laminated contact brushes of copper, the brush-strips 19 being arranged in the slots of a brush-holder 20 in arrangement to make end-contact of the brush-strips with both the roller electrode and the transformer terminal, and the transformer being capacitated for vertical adjustment to vary the tension placed upon the brushes and take up wear.

In the specific construction shown each terminal part 18 of the transformer has its under face dressed off to an inclined plane corresponding with the plane of inclination of the upper surface of the subjacent electrode 12, and carries a brush-holder 20 shaped in inverted-plan on a curve corresponding with the vertical projection of a marginal portion of the face of the electrode. This brush-holder is marginally slotted as at 21 to receive the brushes 19, each of which is preferably of inverted L-shape so that its upper leg may overlie a portion of the brush-holder and its longer leg may depend below the brush-holder for contact with the electrode. The slots 21 are cut at such an angle as properly to incline the brushes so that they lead to the surface of the electrodes at an acute angle, in the direction of intended rotation of the electrodes. Adjustable bolts 22 secure the brush-holder to the secondary terminal, forcing the upper ends of the brushes into contact with said terminal under requisite pressure.

It will thus be seen that the electrical connections are established without recourse to joints between large flat surfaces which, even when most carefully and expensively made, are nevertheless susceptible to some burning and deterioration and occasion a substantial voltage drop in the current supplied to the electrode. The connections afforded as herein shown, establish such short, direct connection through such a large number of thin end-presented brush-laminæ, as insures high efficiency in the conduction of current to the electrodes.

In mounting the transformer 14 for vertical adjustment, I provide on the housing 23 of the transformer suitable brackets 24 slidably embracing the vertical frame-posts 25 that rise from the main frame 10. The posts are preferably shouldered to receive a cross-frame structure 26, and through it extends a suspension bolt 27 non-rotatably engaging and carrying the cover 23' of the transformer housing, said bolt making threaded engagement with the adjusting nut 28 which bears on the cross frame 26 and is preferably provided with easily accessible means to facilitate its rotation. Thus the nut is preferably formed peripherally as a worm wheel 28' engaged by a worm 29, suitably carried by the cross frame 26, the worm-shaft 30 being equipped with a conveniently accessible hand-wheel 31. Of course the worm gearing acts as an adjustment-lock in addition to enabling nut adjustment to be most easily effected. A lifting ring 33, connected to the said bolt 27, enables the entire structure to be raised, as by a crane, when desired.

While the brush-contact arrangement, and disposition of the transformer, as described, may be employed with the electrodes in any position between horizontality and a considerable angle from the horizontal, I prefer to arrange the electrodes at an angle substantially as shown, such that their upper peripheral portions may come quite close together adjacent to the seam-cleft and yet the peripheries may be symmetrically and rather shallowly grooved. Thus, as shown, the electrode-grooves 12$^a$ are rather shallow, for minimizing inequality of wear, lie between symmetrical beveled edge-portions 12$^b$, facilitating easy dressing of the entire periphery, and apply their opposing pressures to the tube in direction tending to force the butted edges of the seam together in very accurate register, all while providing a substantial arc of contact adequate for carrying heavy current. The cooperating supporting-roller 13 is preferably of unitary construction, symmetrically grooved and nearly completing the enclosure of the tube stock by its cooperation with the electrodes. It may be of either conducting or non-conducting material and preferably is mounted in ball bearings 35 in a sub-frame 36 which is longitudinally adjustable on table 36' of the main frame 10. The adjusting screws 37, taking through lugs 31' on the table 36' and abutting against the sub-frame, determine its longitudinal position while the vertical bolts 38 extend through longitudinal slots in the sub-frame to permit of the adjustment.

The roller electrodes are preferably transversely adjustable in the plane of their presentation to the work, to compensate for wear or dressing and to secure just the requisite pressure, and each electrode preferably has its contact-disc readily removable from its bearing-shaft. Thus each electrode 12 is shown as insulatedly secured by bolts 40 to a shaft-head 41 of shaft 42, which is mounted in ba" bearings 43 in a slide carriage 44, this carriage being slidable, in parallelism with the plane of the electrode disc, in a sub-frame 45 which is itself transversely adjustable. An adjusting screw 46 carried by the sub-frame and operated by hand wheel 47 engages a threaded portion 48 of the carriage for effecting requisite adjustment. The sub-frame 45 is transversely slotted to receive the bolts 49 which connect it to the main table 36', and for its lateral adjustment set screws 50 are provided in its side edges to bear respectively against the sub-frame 36 for the supporting roller and against side-flanges 51 formed on the table 36'.

While I have herein described in some detail a particular embodiment of my invention for purposes of full disclosure of one advantageous form thereof, it will be understood by those skilled in the art that many changes may be made in the embodiment of my invention without departure from its spirit and within the scope of the appended claims.

I claim:

1. In an electric welding machine, the combination of a transformer having vertical secondary terminals presenting flat contact-surfaces at their ends; a welding-throat structure including two opposed roller-electrodes rotatable about upwardly-extending axes and each presenting, transversely to its axis, an annular side-surface for traveling contact, the contact-portion thereof being in vertical register with and confronting the end contact-surface of a corresponding one of said secondary terminals; upwardly-extending contact brushes interposed endwise between, and directly establishing low resistance electrical connection between, the confronting surfaces of said secondary terminals and respective electrodes, said brushes making contact at their end-surfaces only with said terminals and electrodes, and a removable brush holder retaining said brushes in operative position, said brushes being removably positioned in said holder.

2. In an electric welding machine, the combination of a welding-throat structure including two opposed electrodes rotatable about upwardly extending axes, a transformer directly above said electrodes and having depending secondary terminals respectively located above said electrodes and between the axes of the latter, contact brushes interposed between, and making end-contact with, respectively a marginal portion of each electrode and the under side of the corresponding secondary terminal, a removable brush holder positioning said brushes, and means for adjusting the transformer relative to the electrodes for varying the tension of the brushes.

3. In an electric welding machine the combination of a welding-throat structure including two opposed electrodes rotatable about upwardly extending axes, a transformer directly above said electrodes and having depending secondary terminals respectively located above said electrodes and between the axes of the latter, contact brushes interposed between, and making end contact with, respectively a marginal portion of each electrode and the under side of the corresponding secondary terminal, and a brush holder removably carried by each said terminal and adjustable relatively thereto to force the upper ends of the brushes into pressure contact with the underside of the terminal, said brushes being demountably carried by the holder and having portions overlying portions of the holder.

4. In an electric welding machine the combination of a welding-throat structure including two opposed electrodes rotatable about upwardly extending axes, a transformer directly above said electrodes and having depending secondary terminals respectively located above said electrodes and between the axes of the latter, contact brushes interposed between, and making end contact with, respectively, a marginal portion of each electrode and the under side of the corresponding secondary terminal, a brush holder removably carried by each said terminal and adjustable relatively thereto to force the upper ends of the brushes into pressure contact with the underside of the terminal, said brushes being demountably positioned in slots in the holder and having upper-end extensions overlying the holder, and means for vertically adjusting the transformer.

5. In an electric welding machine, the combination of a welding-throat structure including grooved supporting-roller means and peripherally-grooved opposed electrodes inclined to the horizontal; a transformer above said electrodes having depending secondary terminals with their lower faces sloped substantially parallel with the upper faces of the electrodes and between the axes of rotation of the latter, an arcuate brush holder secured to the under side of each said terminal, and an arcuate row of brushes mounted in said holder in inclined relation to the plane of the electrode, and making endwise pressure contact with both the electrode surface near its perimeter and the bottom of the secondary terminal.

6. In an electric welding machine the combination of a base, a welding-throat structure mounted on said base and comprising supporting roller-means and two opposed electrodes rotatable about upwardly extending axes, a transformer, means carried by said base for positioning the transformer above said electrodes, means for vertically adjusting said transformer, said transformer, having secondary terminals directly above, and between the axes of rotation of, said electrodes; and contact brushes interposed between the bottoms of said secondary terminals and the respective terminal-confronting upper surfaces of the electrodes and subject to the vertical pressure occasioned by transformer adjustment, to establish a low resistance electrical connection between the secondary terminals and the electrodes.

7. In an electrical welding machine, the combination of a main-frame table, a welding-throat structure mounted thereon comprising a supporting roller rotatable on a horizontal axes and opposed roller electrodes rotatable about upwardly-extending axes, a sub-frame adjustable longitudinally of the main frame table and carrying said supporting roller; two transversely adjustable subframe structures flanking the first mentioned subframe; slide carriages adjustably mounted in the respective two subframes, means for laterally adjusting said respective slide carriages in their subframes, bearings for said electrodes carried by said respective slide carriages, a transformer mounted above said electrodes and having depending secondary terminals above, and between the axes of, said electrodes, means for vertically adjusting the transformer, brush holders carried by the underside of said terminals, and contact brushes positioned by said brush holders and interposed in end-contacting relation between said secondary terminals and the respectively sub-adjacent electrodes and subject to the pressure engendered by vertical adjustment of the transformer.

8. In an electrical welding machine, the combination of a main-frame table, a welding-throat structure mounted thereon comprising a supporting roller rotatable on a horizontal axes and opposed roller electrodes rotatable about upwardly-extending axes, inclined toward each other, each said electrode comprising a peripherally grooved flat disk and a shaft whereon it is detachably secured, a subframe adjustable longitudinally of the main frame table and carrying said supporting roller; two transversely adjustable subframe structures flanking the first mentioned subframe; inclined slide carriages adjustably mounted in the respective two subframes, means for laterally adjusting said respective slide carriages in their subframes, bearings for said electrodes carried by said respective slide carriages, a transformer mounted above said electrodes and having depending secondary terminals above, and between the axes of, and parallel with said electrodes, means for vertically adjusting the transformer, brush holders carried by the underside of said terminals, and contact brushes positioned by said brush holders and interposed in end-contacting relation between said secondary terminals and the respectively sub-adjacent electrodes and subject to the pressure engendered by vertical adjustment of the transformer.

GUSTAVE V. JOHNSTON.